(12) United States Patent
Ghodsi et al.

(10) Patent No.: US 10,095,735 B2
(45) Date of Patent: *Oct. 9, 2018

(54) SYSTEM FOR EXPLORING DATA IN A DATABASE

(71) Applicant: Databricks Inc., San Francisco, CA (US)

(72) Inventors: Ali Ghodsi, Berkeley, CA (US); Ion Stoica, Piedmont, CA (US); Matei Zaharia, Boston, MA (US)

(73) Assignee: Databricks Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,619

(22) Filed: Aug. 11, 2017

(65) Prior Publication Data

US 2018/0046668 A1 Feb. 15, 2018

Related U.S. Application Data

(63) Continuation of application No. 14/621,950, filed on Feb. 13, 2015, now Pat. No. 9,760,602.

(60) Provisional application No. 62/072,105, filed on Oct. 29, 2014.

(51) Int. Cl.
*G06F 7/00* (2006.01)
*G06F 17/30* (2006.01)

(52) U.S. Cl.
CPC .............................. *G06F 17/30424* (2013.01)

(58) Field of Classification Search
CPC .................................................. G06F 17/30424
USPC .......................................................... 707/771
See application file for complete search history.

(56) References Cited

U.S. PATENT DOCUMENTS

| | | | |
|---|---|---|---|
| 2003/0041058 A1* | 2/2003 | Ibuki | G06F 17/3043 |
| 2008/0005118 A1* | 1/2008 | Shakib | G06F 17/30864 |
| 2008/0147647 A1* | 6/2008 | Reeb | G06F 17/30392 |
| 2011/0041069 A1* | 2/2011 | Carletti | G06F 8/34 |
| | | | 715/738 |
| 2014/0195525 A1* | 7/2014 | English | G06F 17/30864 |
| | | | 707/722 |

* cited by examiner

*Primary Examiner* — Binh V Ho
(74) *Attorney, Agent, or Firm* — Van Pelt, Yi & James LLP

(57) ABSTRACT

A system for exploring data in a database comprises a query parser, a parameter manager, a query submitter, and a result formatter. The query parser is to receive a base query and determine an input parameter from the base query. The parameter manager is to provide a first request for a value for the input parameter; receive the value for the input parameter; and provide a second request for the value for the input parameter. The query submitter is to determine a first query using the base query and the value for the input parameter; and provide an indication to execute the first query. The result formatter is to receive a result associated with the indication to execute the first query.

15 Claims, 9 Drawing Sheets

SYSTEM FOR EXPLORING DATA IN A DATABASE

CROSS REFERENCE TO OTHER APPLICATIONS

This application is a continuation of co-pending U.S. patent application Ser. No. 14/621,950, entitled SYSTEM FOR EXPLORING DATA IN A DATABASE, filed Feb. 13, 2015, which claims priority to U.S. Provisional Patent Application No. 62/072,105, entitled SYSTEM FOR EXPLORING DATA IN A DATABASE, filed Oct. 29, 2014, both of which are incorporated herein by reference for all purposes.

BACKGROUND OF THE INVENTION

A database is typically set up to receive database queries, comprising commands for processing database data—e.g., for retrieving, filtering, sorting, etc. A user can execute a database query to view a portion of the database data or to retrieve a portion of the database data for further processing. However, typically in order to explore data, a series of different queries each need to be entered separately.

BRIEF DESCRIPTION OF THE DRAWINGS

Various embodiments of the invention are disclosed in the following detailed description and the accompanying drawings.

DETAILED DESCRIPTION

Figure 1:
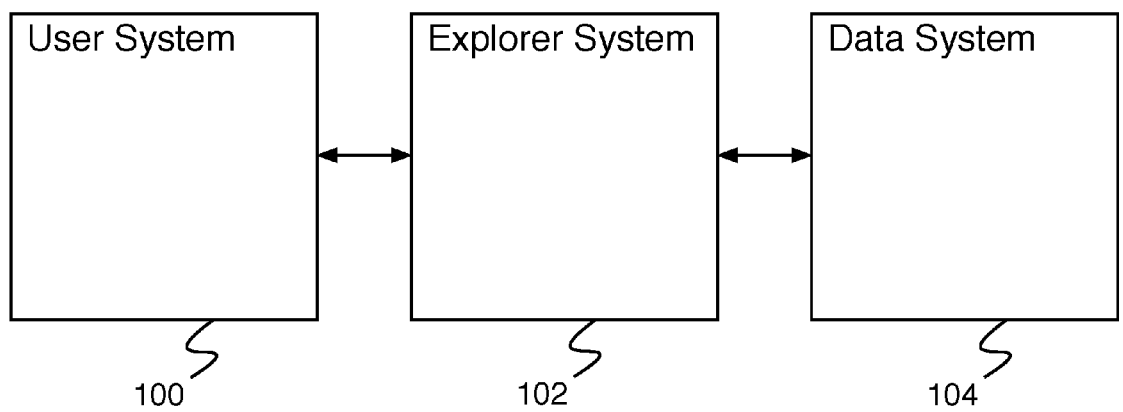
FIG. 1 is a block diagram illustrating an embodiment of a networked database system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for exploring data in a database comprises a query parser to receive a base query and determine an input parameter from the base query, and a parameter manager to provide a first request for a value for the input parameter, receive a value for the input parameter, and provide a second request for the value for the input parameter. The system for exploring data in a database additionally comprises a query submitter to determine a first query using the base query and the value for the input parameter and provide and indication to execute the first query, and a result formatter to receive a result associated with the indication to execute the first query.

In some embodiments, a system for exploring data in a database builds a query for a database from a base query received by a query parser and one or more input parameter values received by a parameter manager. The system enables efficient and rapid exploration of data in the database by allowing rapid parameter changes to queries posed to the database. The base query comprises a database query including one or more query terms replaced by input parameters. The parameter manager requests a value for the one or more input parameters (e.g., from a system user) and provides the received input parameter values to the query submitter. The parameter manager then requests another value for each of the one or more input parameters, allowing the system user to easily execute a series of queries with different input parameter values. The query submitter combines the base query received from the query parser with the input parameter values received from the parameter manager, and submits the complete query to a database system. A query response from the database system is received by a result formatter, which formats the query response and provides the formatted query response to the system user. The result formatter additionally provides an indication to the query submitter that the query response has been received. In the event that the query submitter receives input parameter values from the parameter manager before the query response has been received (e.g., the user entered a new input parameter value or values before the response for the previous value or values was received), the query submitter first provides an indication to the database system to stop the previous query, and then provides an indication to the database system to execute a new query with the new input parameter value or values.

In some embodiments, a database is selected for exploring. In some embodiments, the selected database automatically sets a language for the exploratory query (e.g., structured query language (SQL), Scala, Python, etc.).

FIG. 1 is a block diagram illustrating an embodiment of a networked database system. In the example shown, the networked database system comprises user system 100, explorer system 102, and data system 104. In various embodiments, user system 100 comprises a system (e.g., a computer, a terminal, a smartphone, etc.) used by a computing system user for accessing data, viewing data, processing data, transferring data, or for any other appropriate purpose. In various embodiments, user system 100 comprises or is in communication with a display for displaying a graphical user interface, for displaying data, for displaying database commands, or for any other appropriate purpose. In some embodiments, user system 100 comprises memory (e.g., data memory, instruction memory, volatile memory, non-volatile memory, etc.), any appropriate number of processors, any appropriate number of interfaces, etc. Data system 104 comprises a data system for storing data. In some embodiments, data system 104 stores data in a database. In some embodiments, data system 104 provides database data in response to data queries. In some embodiments, data system 104 comprises memory (e.g., data memory, instruction memory, volatile memory, non-volatile memory, etc.), any appropriate number of processors, any appropriate number of interfaces, etc. Explorer system 102 comprises a system for exploring data in a database. In some embodiments, explorer system 102 receives query information from user system 100. In some embodiments, explorer system 102 receives parameter information from user system 100. In some embodiments, explorer system 102 provides query information to data system 104 and receives query data from data system 104. In some embodiments, explorer system 102 formats query data from data system 104 and provides the formatted query data to user system 100. In some embodiments, explorer system 102 comprises memory (e.g., data memory, instruction memory, volatile memory, non-volatile memory, etc.), any appropriate number of processors, any appropriate number of interfaces, etc. In various embodiments, user system 100, explorer system 102, and data system 104 communicate via a wired connection, a wireless connection, a wife connection, a cellular connection, a local network, a wide area network, an Ethernet network, the Internet, or any other appropriate connection or combination of connections.

Figure 2:
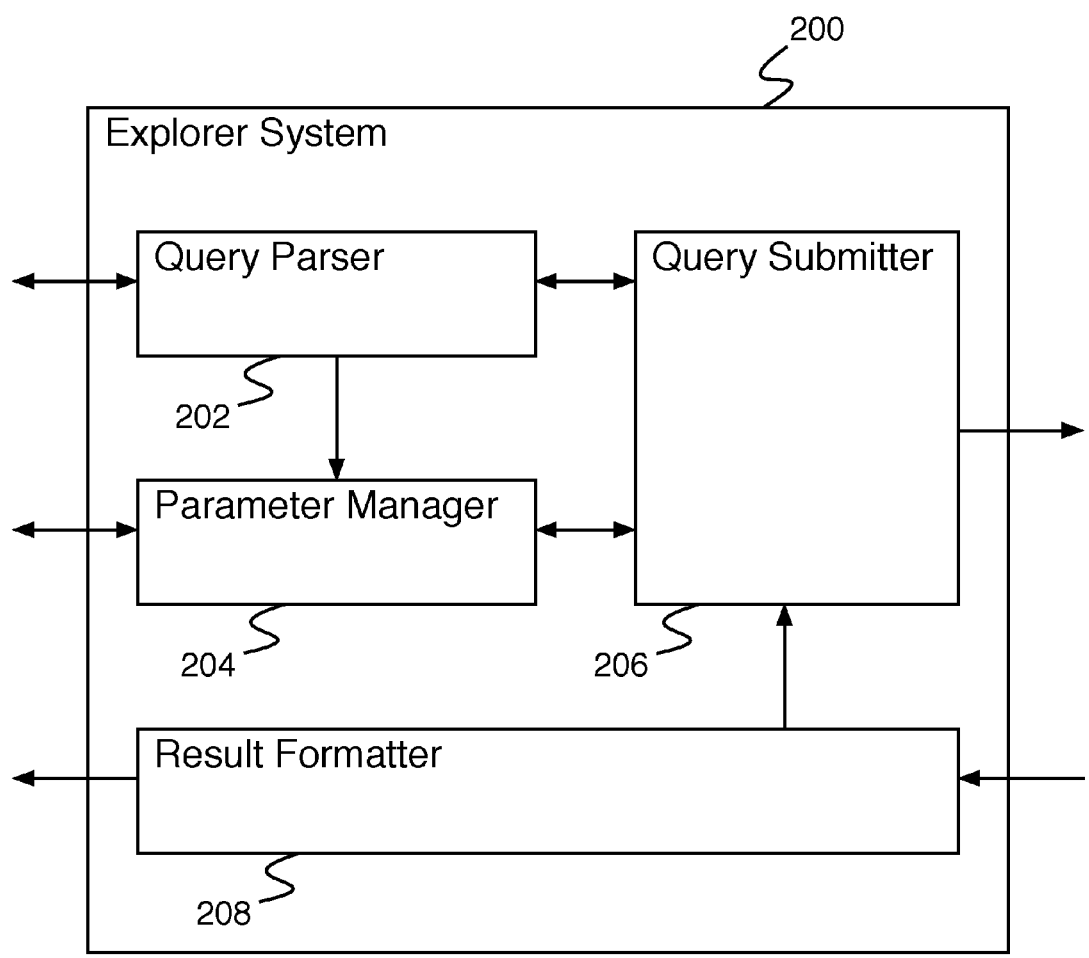
FIG. 2 is a block diagram illustrating an embodiment of an explorer system.

FIG. 2 is a block diagram illustrating an embodiment of an explorer system. In some embodiments, explorer system 200 comprises explorer system 102 of FIG. 1. In the example shown, explorer system 200 comprises query parser 202. Query parser 202 comprises a query parser for receiving and processing a query. In some embodiments, query parser 202 communicates with a user system to request a query, receives a query in response to the query request, and determines an input parameter from the query. In some embodiments, the query parser provides the query to query submitter 206 and the input parameter to parameter manager 204. Parameter manager 204 comprises a parameter manager for receiving an input parameter and receiving an input value for the input parameter. In some embodiments, parameter manager 204 communicates with a user system to request an input value for the input parameter, receives an input value for the input parameter from the user system, and provides the input value for the input parameter to query submitter 206. In some embodiments, parameter manager 204 requests another input parameter from the user system. Query submitter 206 comprises a query submitter for receiving a query and an input value and submitting a query. In some embodiments, query submitter 206 receives a query from query parser 202, receives an input value from parameter manager 204, and submits a query (e.g., to a data system). In some embodiments, query submitter 206 receives an indication from result formatter 208 that a query has been completed. Result formatter 208 comprises a result formatter for receiving a result, formatting the result, and providing the formatted result.

Figure 3:
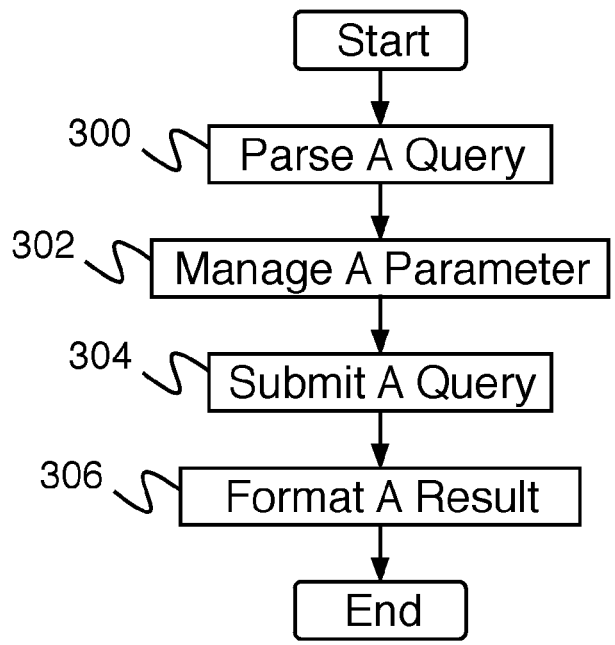
FIG. 3 is a flow diagram illustrating an embodiment of a process for exploring data.

FIG. 3 is a flow diagram illustrating an embodiment of a process for exploring data. In some embodiments, the process of FIG. 3 is executed by an explorer system (e.g., explorer system 200 of FIG. 2). In the example shown, in 300, the system parses a query. For example, the query is parsed to determine the parameters that are present and the base query (e.g., the portion of the query that remains the same). In various embodiments, the parameter(s) comprises a substring of the query, a string of the query, multiple elements in the query, or any other appropriate portion of the query. In 302, the system manages a parameter. For example, the manager manages the loading of one or more values into the parameter(s). In some embodiments, a single parameter is loaded for multiple queries. In some embodiments, multiple parameters are loaded. In some embodiments, one of multiple parameters is changed while other parameters remain fixed. In some embodiments, many parameters are changed for a query while others remain fixed. In 304, the system submits a query. For example, the system submits a query making the appropriate substitutions for parameter(s) in the query leaving the base query alone. In 306, the system formats a result. For example, the results of the query are received back and formatted for display to the user.

Figure 4:
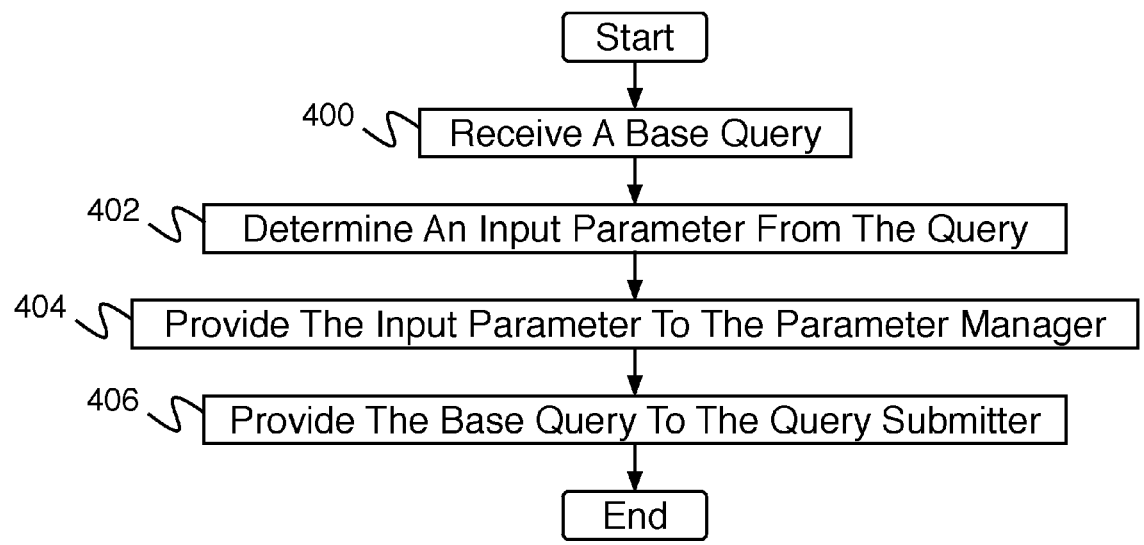
FIG. 4 is a flow diagram illustrating an embodiment of a process for parsing a query.

FIG. 4 is a flow diagram illustrating an embodiment of a process for parsing a query. In some embodiments, the process of FIG. 4 implements 300 of FIG. 3. In some embodiments, the process of FIG. 4 is executed by query parser 202 of FIG. 2. In the example shown, in 400, a base query is received. In some embodiments, the base query is received in response to a request for a query. In some embodiments, the base query comprises an input parameter. In various embodiments, the base query comprises one, two, three, five, or any other appropriate number of input parameters. In 402, an input parameter is determined for the query. For example, a query includes a term '$input_parameter' where the '$' indicates an input parameter called in this case 'input_parameter'. In various embodiments, a parameter indicator is any ASCII character (e.g., '$', '#', '*', etc.), combination of characters, or any other appropriate indicator. In some embodiments, more than one input parameter is determined for the query. In some embodiments, determining the input parameter for the query comprises analyzing the query and determining the input parameter (e.g., by a parameter name, a parameter formatting, a parameter key character, etc.). In 404, the input parameter is provided to the parameter manager. In some embodiments, more than one input parameter is provided to the parameter manager. In 406, the base query is provided to the query submitter.

In some embodiments, an example of a database query comprises:
select $xy, name
from $tab
where name='lee'

The parameter manager requests a value for $xy—for example, by presenting an input field (e.g., a pop up a text box) for a value for $xy. The user can enter a value for the parameter $xy (e.g., col1, col2, etc.). The parameter manager requests a value for $t1—for example, by presenting an input field (e.g., a pop up a text box) for a value for $t1. The user can enter a value for the parameter $tab (e.g., table t1, t2, etc.). In various embodiments, the user is prompted for each parameter sequentially (e.g., $xy and then $tab), the user is prompted for each parameter simultaneously, or in any other appropriate manner. In some embodiments, a substring is parameterized (e.g., column+$num). In some embodiments, a default is specified for and associated with a parameter (e.g., $xy="col1", $xy=[col1=default], etc.). In various embodiments, parameters are specified with one or more of the following input widget types: a list (e.g., $xy=list["a", "b", "c"]), a slider (e.g., $xy=slider[0, 10, 3=default]), radio buttons (e.g., [ab, cd, ef]), multiple text boxes, or any other appropriate input widget type.

In some embodiments, the parameter manager stores the base query and the last values of the parameters in order to generate a next query. The next query is generate using any changed parameters as received from a user and the unchanged parameter values as configured with the base query. In some embodiments, a last value for a given parameter comprises a default parameter value. In some embodiments, a user is provided a last parameter value as a display in order for the user to determine a next parameter value to input. In some embodiments, a user is provided with a set of previously provided parameter values that the user can elect to reuse for any of the given parameters of the base query.

Figure 5:
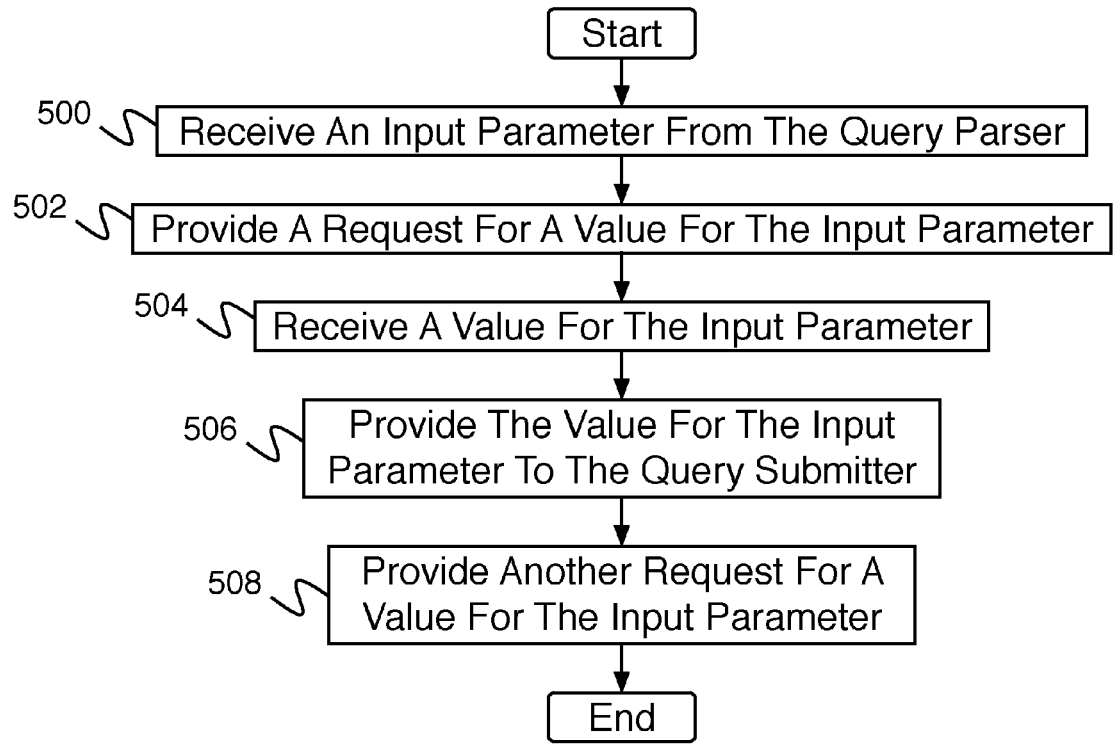
FIG. 5 is a flow diagram illustrating an embodiment of a process for managing a parameter.

FIG. 5 is a flow diagram illustrating an embodiment of a process for managing a parameter. In some embodiments, the process of FIG. 5 implements 302 of FIG. 3. In some embodiments, the process of FIG. 5 is executed by parameter manager 204 of FIG. 2. In the example shown, in 500, an input parameter is received from the query parser. In some embodiments, more than one input parameter is received from the query parser. In 502, a request is provided for a value for the input parameter (e.g., to a user system). In 504, a value is received for the input parameter. In 506, the value for the input parameter is provided to the query submitter. In 508, another request is provided for a value for the input parameter. For example, the system is then ready to receive a new parameter at any time (e.g., after a request result is received, prior to receiving a request result, etc.).

In some embodiments, a parameter checking is done as part of inputting the parameter value. For example, as the user inputs a value, the database is queried for all existing entries or all appropriate entries (e.g., in a row, in a column, associated with a prior portion of the query, etc.) and these entries are presented to the user a possible parameter entry values. In some embodiments, in the event that the parameter value selected does not appear in the database, an error message is presented to a user.

Figure 6:
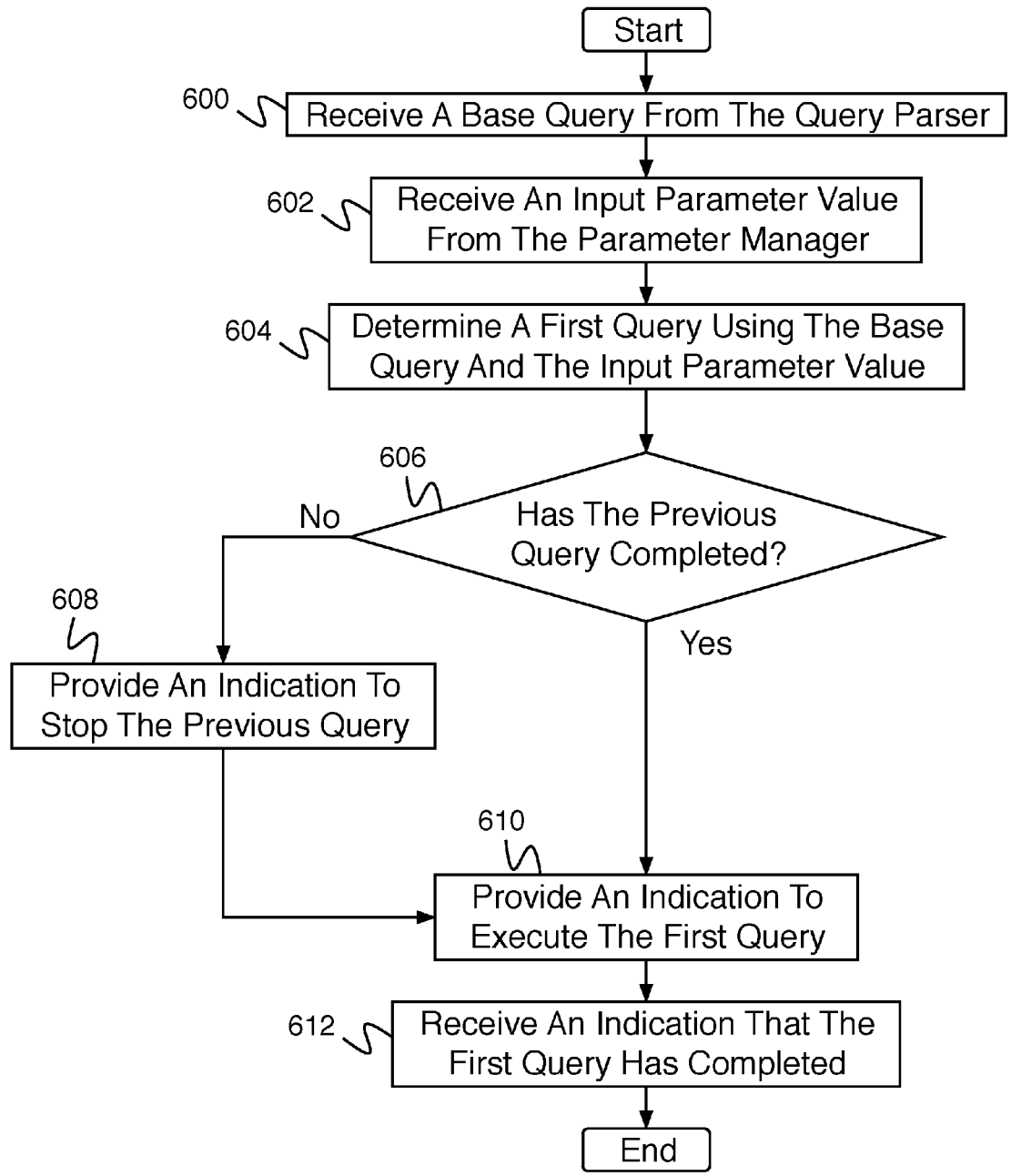
FIG. 6 is a flow diagram illustrating an embodiment of a process for submitting a query.

FIG. 6 is a flow diagram illustrating an embodiment of a process for submitting a query. In some embodiments, the process of FIG. 4 implements 304 of FIG. 3. In some embodiments, the process of FIG. 6 is executed by query submitter 206 of FIG. 2. In the example shown, in 600, a base query is received from the query parser. In 602, an input parameter value is received from the parameter manager. In some embodiments, more than one input parameter value is received from the parameter manager. In 604, a first query is determined using the base query and the input parameter value. In some embodiments, the first query is determined by substituting the input parameter value for the input parameter within the first query. In 606, it is determined whether the previous query has completed. In some embodiments, it is determined whether the previous query has completed by determining whether an indication that the previous query has completed was received from a result formatter. In the event it is determined that the previous query was completed, control passes to 610. In the event it is determined that the previous query was not completed, control passes to 608. In 608, an indication is provided to stop the previous query (e.g., to a data system). In 610, an indication to execute the first query is provided (e.g., to the data system). In 612, an indication is received that the first query has completed.

Figure 7:
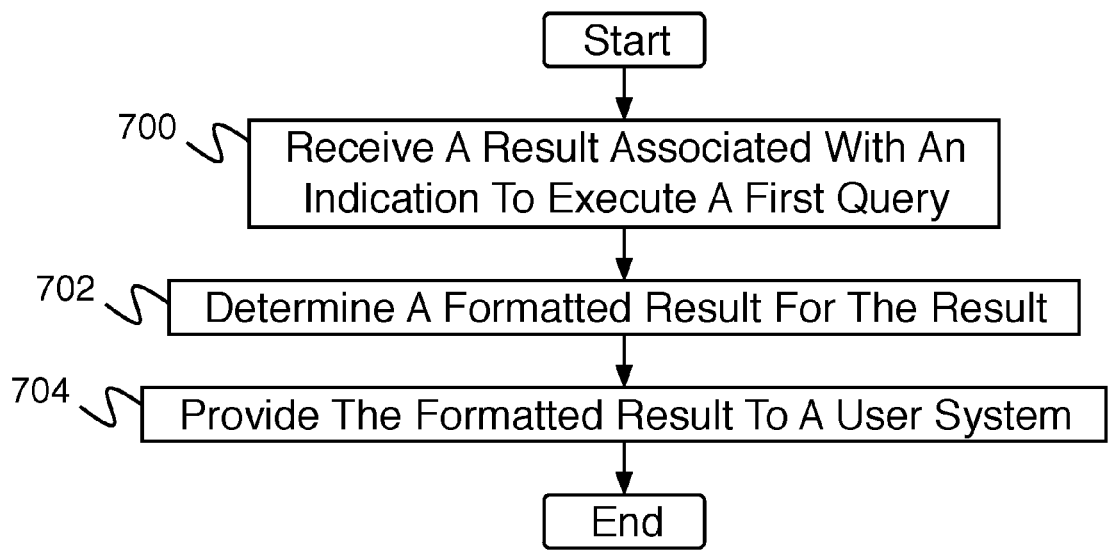
FIG. 7 is a flow diagram illustrating an embodiment of a process for formatting a result.

FIG. 7 is a flow diagram illustrating an embodiment of a process for formatting a result. In some embodiments, the process of FIG. 7 implements 306 of FIG. 3. In some embodiments, the process of FIG. 7 is executed by result formatter 208 of FIG. 2. In the example shown, in 700, a result associated with an indication to execute a first query is received. In 702, a formatted result is determined for the result. In some embodiments, a formatted result comprises a result formatted to be viewed by a user. In various embodiments, a formatted result comprises a result formatted as a chart, a graph, a table, or any other appropriate way. In 704, the formatted result is provided to a user system.

In some embodiments, formatted results are provided as an interactive pivot table that allows a user to select an alternate view of the data in a table. The parameter manager receives from a user an alternate view desired for the pivot table and the parameter manager automatically reformats the table by generating a database query for the new configuration of table desired, submits the query, and provides the updated table to the user. In some embodiments, the new table generated is based on a query of the entire dataset of the database (e.g., including database data other than data in the current table). In some embodiments, one or more previous formatted outputs and current formatted output are presented simultaneously to enable a comparison between the outputs (e.g., side by side, in a matrix—for example, a grid, up and down, etc.). In some embodiments, the parameter values are indicated with the formatted output to enable recognition by the user of which formatted output is associated with which parameter values.

Figure 8:
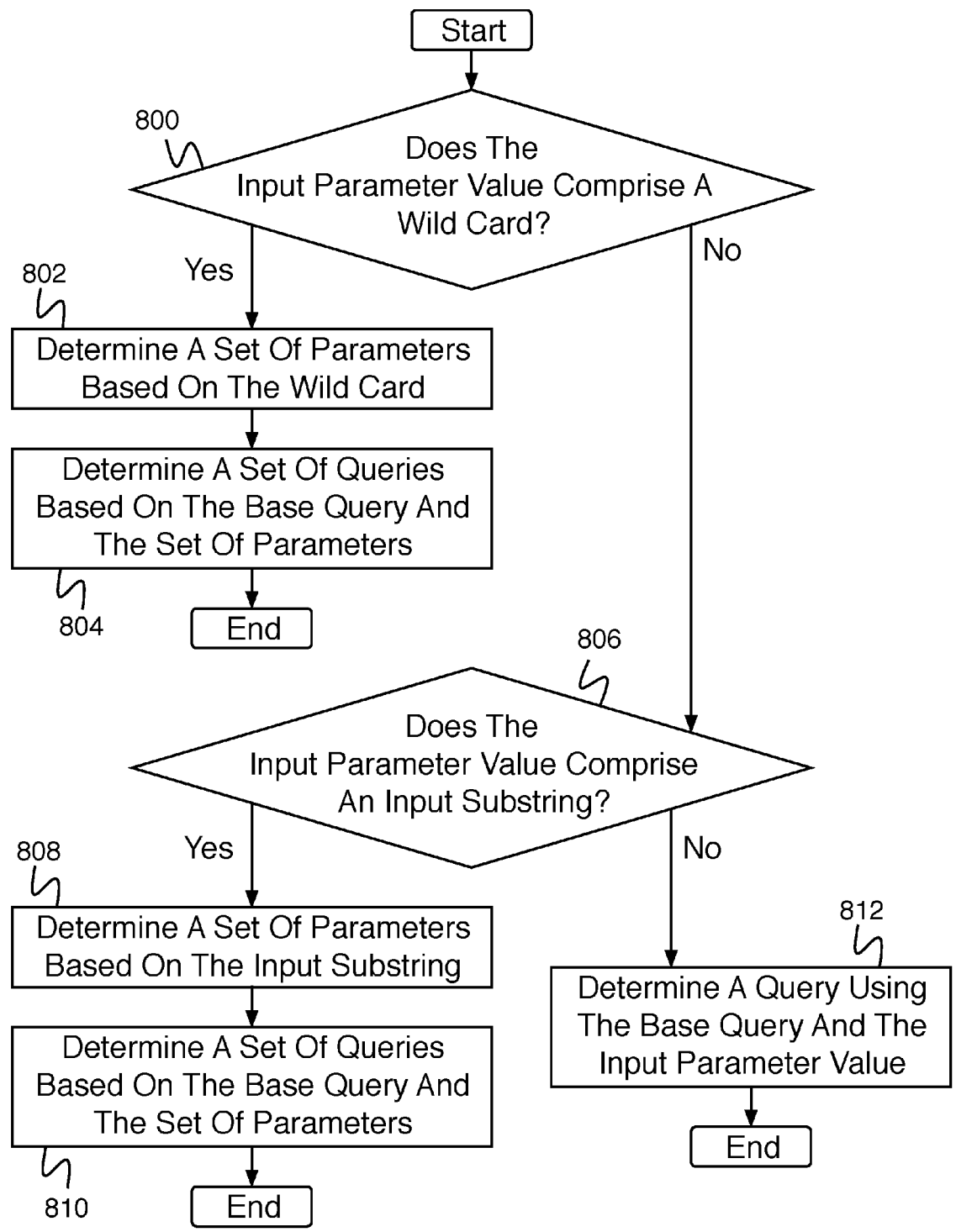
FIG. 8 is a flow diagram illustrating an embodiment of a process for determining a first query using a base query and an input parameter value.

FIG. 8 is a flow diagram illustrating an embodiment of a process for determining a first query using a base query and an input parameter value. In some embodiments, the process of FIG. 8 implements 604 of FIG. 6. In the example shown, in 800, it is determined whether the input parameter value comprises a wild card. In some embodiments, a wild card comprises a wild card symbol (e.g., "*"), indicating that the wild card symbol can be replaced with any other text. In the example shown, in the event the input parameter value does not comprise a wild card, control passes to 806. In the event the input parameter value comprises a wild card, control passes to 802. In 802, a set of parameters based on the wild card is determined. In some embodiments, the set of parameters based on the wild card comprises a set of parameters wherein the wild card is replaced with each of a set of text strings. In various embodiments, the set of text strings comprises all possible text strings, all possible text strings up to a certain length, all legal text strings, all text strings found in database, or any other appropriate set of text strings. In 804, a set of queries is determined based on the base query and the set of parameters. In some embodiments, a set of queries is determined based on the base query and the set of parameters by replacing the input parameter in the base query with each parameter of the set of parameters. The process then ends.

In 806, it is determined whether the input parameter value comprises an input substring. In the event it is determined that the input parameter value does not comprise an input substring, control passes to 812. In the event it is determined that the input parameter value comprises an input substring, control passes to 808. In 808, a set of parameters is determined based on the input substring. In some embodiments, the set of parameters based on the input substring comprises a set of parameters wherein the input substring is followed by each of a set of text string. In various embodiments, the set of text strings comprises all possible text strings, all possible text strings up to a certain length, all legal text strings, all possible strings matching database entries, or any other appropriate set of text strings. In 810, a set of queries is determined based on the base query and the set of parameters. In some embodiments, a set of queries is determined based on the base query and the set of parameters by replacing the input parameter in the base query with each parameter of the set of parameters. The process then ends. In 812, a query is determined using the base query and the input parameter value. In some embodiments, the query is determined by replacing the input parameter in the base query with the input parameter value.

Figure 9:
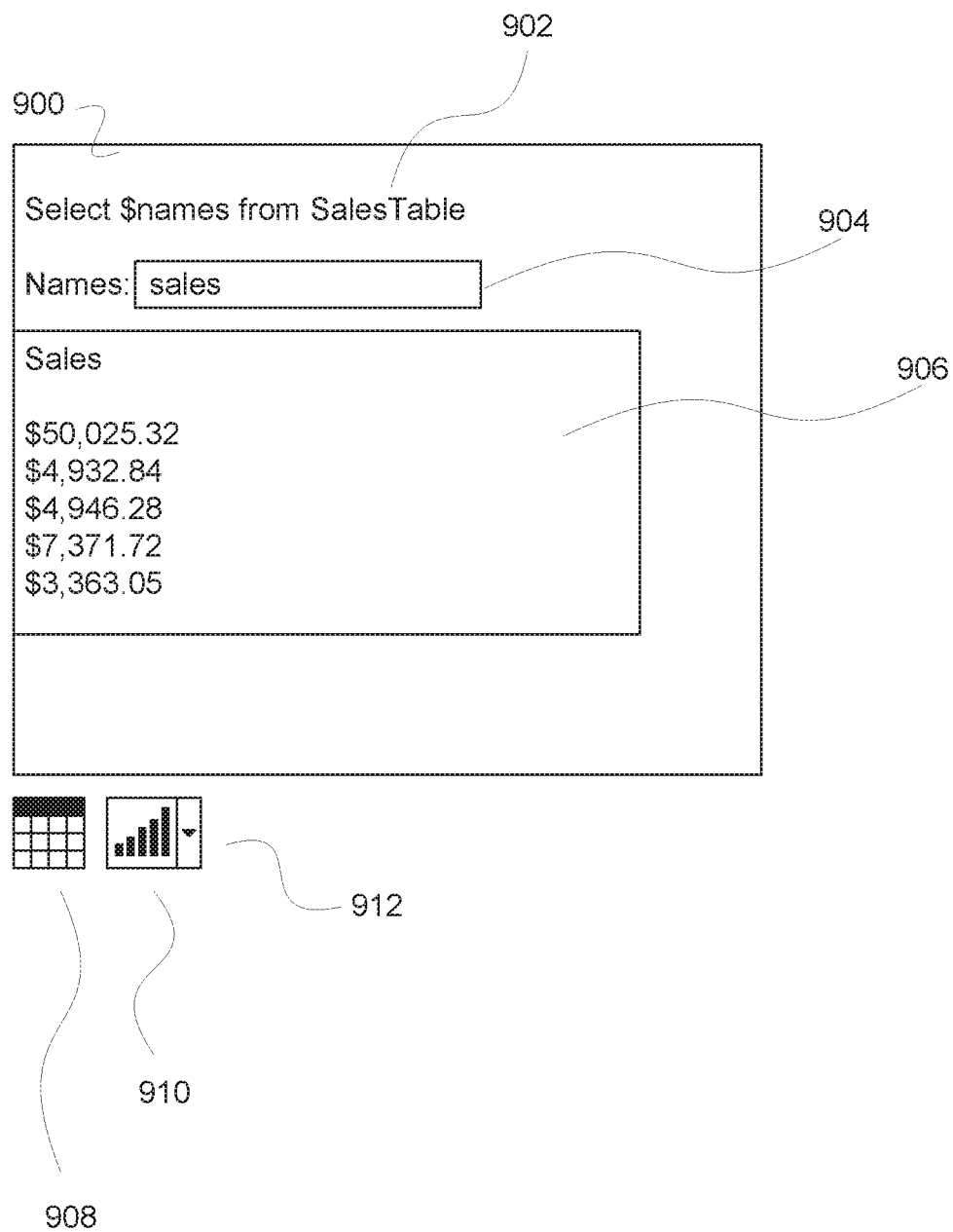
FIG. 9 is a diagram illustrating an embodiment of a user interface display.

FIG. 9 is a diagram illustrating an embodiment of a user interface display. In the example shown, interface display 900 includes database exploration query 902 (e.g., a base query indicating a parameter and a database table—for example, a parameter $names and a database table SalesTable. Interface display 900 includes parameter entry widget 904 (e.g., for the parameter names a text box for entering a parameter value). In various embodiments, a parameter entry widget comprises one of the following: a text field, a list, a pull down box, a slider bar, radio buttons, or any other appropriate entry widget. Formatted output 906 includes output data resulting from the base query with the parameter defined using the parameter entry widget 904. For example, output for names=Sales is a list of values $50,025.32, $4932.84, $4946.28, $7371.72, and $3,363.05. Table format icon 908 enables a user to format the output (e.g., change column and row configurations). Graph format icon 910 enables a user to format the output as a graph (e.g., a line graph, a bar graph, a pie chart, etc.). Graph selector 912 enables a user to select a type of graph from a pop down window.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for exploring data in a database, comprising:
a processor; and
a memory coupled with the processor, wherein the memory is configured to provide the processor with instructions which when executed cause the processor to:
receive a base query;
determine an input parameter from the base query;
provide a first request for a value for the input parameter;
receive the value for the input parameter;
provide a second request for the value for the input parameter;
determine a first query using the base query and the value for the input parameter, wherein the value for the input parameter comprises an input substring, and wherein the determining of the first query comprises to:
determine that the value for the input parameter includes the input substring;
determine a set of parameters based on the input substring, the set of parameters including the input substring, the input substring being followed by each of a set of text string, the set of text strings comprises all possible text strings, all possible text strings up to a certain length, all legal text strings, all possible strings matching database entries, or any combination thereof; and
determine a set of queries based on the base query and the set of parameters, the set of queries including the first query;
provide an indication to execute the first query; and
receive a result associated with the indication to execute the first query.

2. The system of claim 1, wherein the indication to execute the first query is provided to a data system.

3. The system of claim 1, wherein the receiving of the result comprises to:
determine a formatted result for the result.

4. The system of claim 3, wherein the receiving of the result comprises to:
provide the formatted result.

5. The system of claim 4, wherein the receiving of the result comprises to:
provide the formatted result to a user system.

6. The system of claim 1, wherein the input parameter is one of a plurality of input parameters.

7. The system of claim 1, wherein the first request for the value for the input parameter is provided to a user.

8. The system of claim 1, where the value for the input parameter comprises a wild card.

9. The system of claim 8, wherein the first query comprises a set of queries based at least in part on the wild card.

10. The system of claim 1, wherein the processor further comprises to:
receive another value for the input parameter in response to the second request prior to the receiving of the result associated with the indication to execute the first query.

11. The system of claim 10, wherein the determining of the first query comprises to:
provide an indication to stop executing the first query.

12. The system of claim 11, wherein the determining of the first query comprises to:
provide an indication to execute another query.

13. The system of claim 1, wherein the input parameter has an associated default value.

14. A method for exploring data in a database, comprising:
receiving a base query;
determining, using a processor, an input parameter from the base query;
providing a first request for a value for the input parameter;
receiving the value for the input parameter; and
providing a second request for the value for the input parameter;
determining a first query using the base query and the value for the input parameter, wherein the value for the input parameter comprises an input substring, and wherein the determining of the first query comprises:
determining that the value for the input parameter includes the input substring;
determining a set of parameters based on the input substring, the set of parameters including the input substring, the input substring being followed by each of a set of text string, the set of text strings comprises all possible text strings, all possible text strings up to a certain length, all legal text strings, all possible strings matching database entries, or any combination thereof; and determining a set of queries based on the base query and the set of parameters, the set of queries including the first query;

providing an indication to execute the first query; and receiving a result associated with the indication to execute the first query.

15. A computer program product for exploring data in a database, the computer program product being embodied in a non-transitory computer readable storage medium and comprising computer instructions for:

receiving a base query;

determining, using a processor, an input parameter from the base query;

providing a first request for a value for the input parameter;

receiving the value for the input parameter;

providing a second request for the value for the input parameter;

determining a first query using the base query and the value for the input parameter, wherein the value for the input parameter comprises an input substring, and wherein the determining of the first query comprises:

determining that the value for the input parameter includes the input substring;

determining a set of parameters based on the input substring, the set of parameters including the input substring, the input substring being followed by each of a set of text string, the set of text strings comprises all possible text strings, all possible text strings up to a certain length, all legal text strings, all possible strings matching database entries, or any combination thereof; and determining a set of queries based on the base query and the set of parameters, the set of queries including the first query;

providing an indication to execute the first query; and receiving a result associated with the indication to execute the first query.

* * * * *